US009975373B2

(12) United States Patent
Ait Gherbi

(10) Patent No.: US 9,975,373 B2
(45) Date of Patent: May 22, 2018

(54) ITEM COMPRISING A MOUNTING AND A DECORATIVE DESIGN ELEMENT EMBEDDED IN THE MOUNTING AND VISIBLE

(71) Applicant: Malika Ait Gherbi, Paris (FR)

(72) Inventor: Malika Ait Gherbi, Paris (FR)

(73) Assignee: Malika Ait Gherbi, Paris (FR)

( * ) Notice: Subject to any disclaimer, the term of this patent is extended or adjusted under 35 U.S.C. 154(b) by 0 days. days.

(21) Appl. No.: 15/127,665

(22) PCT Filed: Mar. 23, 2015

(86) PCT No.: PCT/EP2015/056153

§ 371 (c)(1),
(2) Date: Oct. 13, 2016

(87) PCT Pub. No.: WO2015/140354

PCT Pub. Date: Sep. 24, 2015

(65) Prior Publication Data

US 2017/0197458 A1 Jul. 13, 2017

(30) Foreign Application Priority Data

Mar. 21, 2014 (FR) ...................................... 14 52421

(51) Int. Cl.
*B32B 3/06* (2006.01)
*B44C 1/26* (2006.01)

(52) U.S. Cl.
CPC ...................................... *B44C 1/26* (2013.01)

(58) Field of Classification Search
CPC ........... Y10T 428/22; Y10T 428/24331; A44C 17/02; A44C 17/04
See application file for complete search history.

(56) References Cited

U.S. PATENT DOCUMENTS

| | | | |
|---|---|---|---|
| 1,996,187 A | 4/1935 | Barnhart | |
| 2003/0180498 A1 * | 9/2003 | De Winter | .............. B29C 33/12 428/67 |

FOREIGN PATENT DOCUMENTS

| | | |
|---|---|---|
| DE | 753084 | 1/1951 |
| DE | 19758496 | 3/1999 |
| EP | 1251232 | 10/2002 |
| FR | 2260966 | * 9/1975 |
| FR | 2606891 | 5/1988 |

OTHER PUBLICATIONS

Translation of FR 2260966 retrieved Jun. 5, 2017.*

* cited by examiner

*Primary Examiner* — Alexander Thomas
(74) *Attorney, Agent, or Firm* — Duane Morris LLP; Gregory M. Lefkowitz; Jason M. Nolan

(57) ABSTRACT

The invention relates to an item comprising a mounting and at least one design element, such as a decorative element, embedded in the mounting, the mounting including at least one free surface portion, at least one first and one second body of material underlying the surface portion, a recess for the design element being made in the first and second bodies of the mounting and said design element being arranged in the recess, characterized in that the design element includes a first portion, which is visible from the free surface portion of the mounting, and a lateral extension relative to the first portion, said extension being covered by the first body of material so as to prevent any movement of the design element out of the recess.

13 Claims, 2 Drawing Sheets

ITEM COMPRISING A MOUNTING AND A DECORATIVE DESIGN ELEMENT EMBEDDED IN THE MOUNTING AND VISIBLE

CROSS-REFERENCE TO RELATED APPLICATIONS

This application is a § 371 national stage entry of International Application No. PCT/EP2015/056153, filed Mar. 23, 2015, which claims priority to French Patent Application No. 1452421 filed Mar. 21, 2014, the entire contents of which are incorporated herein by reference.

FIELD OF THE INVENTION

The present invention relates to the field of decorating any kind of item or article by embedding decorative design elements in surface portions thereof that form a mounting. The invention can be applied to any material, in particular whether rigid or flexible, that can form a mounting. The design element can be a precious stone or a non-precious stone, a setting, or more generally any element that can be embedded in a supporting material.

PRIOR ART

To brighten up a surface portion of some articles or items, decorative design elements are often arranged and attached. One known way is to glue these elements to the surface portion of the article, possibly within a cavity made in the mounting. However, the glue can deteriorate over time, or rather the glue film may give way when subjected to extraction forces during use of the article thus decorated. This manner of joining is thus unsatisfactory in some cases. When allowed for by the mounting, another known way is mechanical and involves producing a screw element or a complementary element which is placed on the opposite side of the surface portion to be decorated, and screwing or riveting the decorative design element through the mounting. Apart from the increased thickness produced by the connection, this manner of joining is not suitable for a wide range of design elements. In particular, the element has to have a minimum size for the mechanical connection.

The object of the invention is to provide a novel way of joining a decorative design element to a mounting, without the drawbacks of the prior art.

DISCLOSURE OF THE INVENTION

The invention relates to an item comprising a mounting and at least one design element, such as a decorative design element, that is embedded in the mounting and visible, the mounting comprising at least one free surface portion, at least a first and a second body of material below the surface portion, a recess for the design element being made in the first and second bodies of the mounting and said design element being arranged in the recess. The item according to the invention is characterised in that the design element comprises a first portion that is visible from the free surface portion of the mounting, and a lateral extension with respect to the first portion, said extension being covered by the first body of material such as to completely prevent the design element moving out of the recess.

The item according to the invention has the advantage of holding the decorative element within a recess or cavity made in the body of the mounting, the means for holding the design element being provided by a body of material that is directly below the surface of the mounting and forms the upper layer of the mounting.

Though not limited thereto, the material forming the mounting in which the design element is embedded is a flexible material such as a skin, a flexible synthetic resin, a rubber, a textile product, leather, a rigid or semi-rigid material such as wood, tile, metal, glass or a rigid synthetic resin, but may also be cement-, stone- or plaster-based. The mounting can also be a combination of these materials. The materials can be of any origin—plant, animal, mineral, synthetic, natural or artificial.

Advantageously, the decorative design element is a precious or non-precious stone, either alone or countersunk in a setting, or is a textile element, an electronic component or any other element.

According to one aspect of the invention, said setting comprises a body provided with said extension, said body containing a stone.

Alternatively, said body comprises a peg on a side of the body opposite that containing the stone.

More generally, said design element can be defined by any solid, rigid or flexible element having a shape in which it is possible to distinguish between a first portion that defines the visible portion when mounted on the mounting, and a second portion that forms a lateral extension with respect to said first portion.

According to an advantageous embodiment, at least part of the lateral extension of the design element forms a flange.

According to another feature, the recess in the mounting comprises a first recess portion for the first, visible portion, and a second recess portion for the lateral extension of the design element. In this way, the recess comprises a neck housing the visible portion of the decorative element.

According to an advantageous embodiment, the mounting comprises at least two interconnected material layers forming said first and second bodies. The mounting can comprise a greater number of layers and can be formed by a stack of layers interconnected by gluing or any other means, for example by stitching.

The invention also relates to a method for producing the above item. Said method comprises the following steps:

- providing a mounting having a free surface portion and a first body below the surface portion, and a design element having a first portion forming the visible portion through the surface portion, and a second portion forming a lateral extension;
- making a recess for the design element in the mounting, which recess is open on the free surface portion, the recess comprising a first portion in the first body of material for the first portion of the design element and a second portion in the second body for the lateral extension;
- placing the design element in the recess.

More particularly, the mounting comprises at least two layers: a first layer forming the first body and a second layer forming the second body; the two layers are interconnected in order to lock the design element in its recess.

The product forming the design element can be liquid when introduced into the recess and solidified afterwards. For example, the product can be ice cubes. More particularly, it can be food products.

The invention can advantageously be applied to the fields of ready-to-wear clothing, jewelry, leathercraft, footwear, lingerie having leather-based support materials, fabrics, plastics, and metal. The invention can also be applied to building decoration or furniture decoration. It can also be applied to the automotive, aviation and marine fields.

DESCRIPTION OF THE DRAWINGS

Other features, elements and advantages of the invention will become clear upon reading the following detailed yet non-limiting description of several embodiments, given with reference to the accompanying drawings, in which.

DETAILED DESCRIPTION OF VARIOUS EMBODIMENTS OF THE INVENTION

Figure 1:
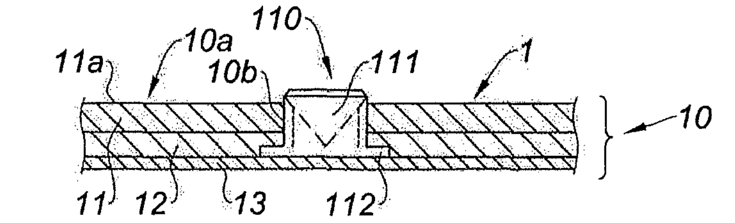
FIG. 1 is a schematic cross section of an item according to the invention in accordance with a first embodiment.

With reference first to FIG. 1, according to a first embodiment of the invention, the figure shows a detail of an item comprising a mounting 10 and a decorative design element 110. In this case, the mounting consists of three layers 11, 12, 13 of material, for example a flexible material such as leather, in which the decorative element 110 is embedded, for example a setting that in turn contains a stone. The element 110 is embedded by being housed and held in a recess made in the body of the mounting 10.

The mounting has a surface portion that has a visible outer face 11*a*.

The design element 110 is shaped so as to have a first portion 111 and a second portion 112. The first portion 111 is visible on the side of the surface portion 10*a* of the mounting. Here, said first portion protrudes slightly and creates a raised portion in relation to said face 10*a*. The second portion 112 forms a lateral extension with respect to the first portion 111 and is not visible from the face 10*a*; it is covered by a body of material of the mounting 10. The recess 10*b* in the mounting 10 thus comprises a first portion corresponding to the first portion 111 of the element 110. The recess 10*b* in the mounting comprises a second portion in which the element is placed by its lateral extension 112. The mounting comprises a second body covering the opposite side of the element. In this case, this second body is formed by the layer 13 opposite the face 10*a*. By covering the lateral extension on both sides, the element in locked in position and cannot be detached from the mounting. In other words, the recess 10*b* is defined by a space for the first portion 111 of the design element 110, said space being formed by the first body of material, defined in this case by the two material layers 11, 12, said recess 10*b* further being formed by the second body of material, defined in this case by the single material layer 13, which closes said space facing said lateral extension 112.

Advantageously, the layers 11, 12, 13 forming the bodies of the mounting are glued together. They can also be connected in a different manner.

Figure 2:
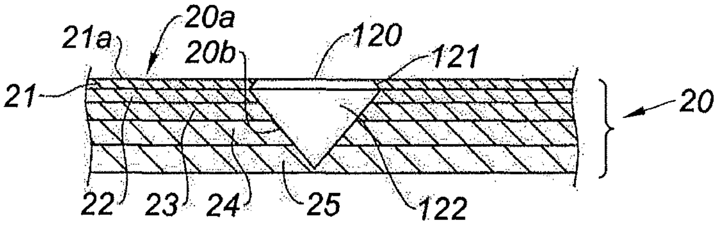
FIG. 2 is a schematic cross section of an item according to the invention in accordance with a second embodiment.

FIG. 2 shows another embodiment of the invention. In this case, the design element 120 is a cut stone. The stone is formed by a first, visible portion 121, and by a second portion 122 at its periphery, which forms the lateral extension. In this case, the stone is frustoconical on the visible-face side and conical on the opposite side. The frustoconical face of the upper portion forms the lateral extension 122 of the top side, and the surface at the bottom of the conical portion forms the lateral extension of the opposite side.

The mounting 20 comprises a stack of six layers 21, 22, 23, 24, 25, 26 interconnected by gluing, for example having a cavity forming an exact-fitting recess containing the stone 120. In this case, it is possible to see the upper layer 21, the free face of which is the surface portion 20*a*. The upper layer 21 covers the lateral extension 122 of the design element 120. In this way, on the one hand the upper layer 21 partially covers the design element 120 and on the other hand the layers 22 to 25 below hold the element 120 in the body of the mounting.

Figure 3:
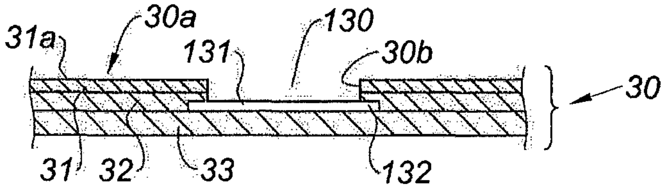
FIG. 3 is a schematic cross section of an item according to the invention in accordance with a third embodiment.

FIG. 3 shows another embodiment of the invention. The mounting 30 is formed of three layers 31, 32 and 33 placed one on top of the other and interconnected, having a visible surface portion 30*a* corresponding to the free face 31*a* of the upper layer 31.

In this case, the design element 130 is discoid having a first, visible portion 131 in the centre, and a second, peripheral portion forming the lateral extension 132. The recess 30*b* in the mounting contains the element 130 and the upper layers 31 and 32 cover the lateral extension 132 on the visible-face side 30*a*. The opposite side of the lateral extension 132 is covered by the layer 33. The element 130 is thus held in place by the layers of the mounting engaging with the lateral extension 132.

Figure 4:
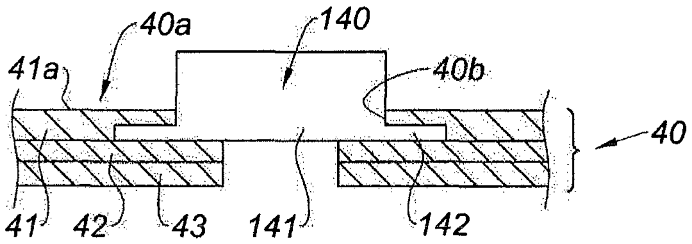
FIG. 4 is a schematic cross section of an item according to the invention in accordance with a fourth embodiment.

FIG. 4 shows a fourth embodiment comprising a mounting 40 formed of three layers 41, 42, 43 and a design element 140 in the recess 40*b*, which element can for example be a setting as in example 1. The element comprises a first portion 141 that is visible through the face 40*a* of the mounting that corresponds to the visible face 41*a* of the upper layer 41. The first portion 141 is raised in relation to the face 40*a*. However, the element 140 is held captively by the lateral extension 142 between the layers 41 and 42. Here, the opposite face has a central opening in relation to the element 140.

Figure 5:
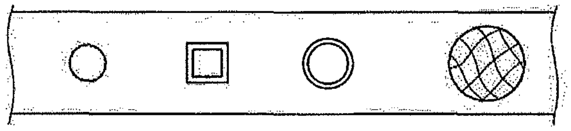
FIG. 5 is a schematic plan view of the item having various types of decorative design element.

FIG. 5 shows plan views of different types of design element. These can be round, square or another shape.

Figure 6:
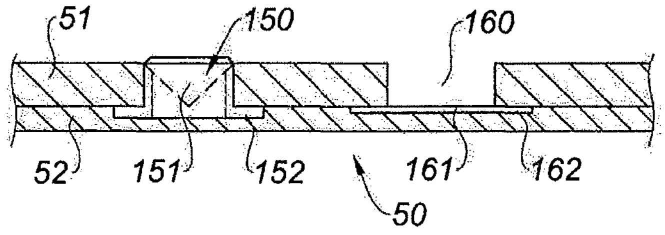
FIG. 6 shows embodiments having a rigid upper layer.

FIG. 6 shows two embodiments having a rigid upper layer. The upper layer can be wood, for example. The decorative design element 150 rests on a layer 52 that can be rigid or flexible and in which a recess has been cut. Said element is held in place and locked by the upper layer 51, which has a hole to allow the visible portion 151 of the element 150 to pass through. The lateral extension 152 of the element 150 is sandwiched between the two layers 51 and 52. The same figure shows another, discoid element 160.

Figure 7:
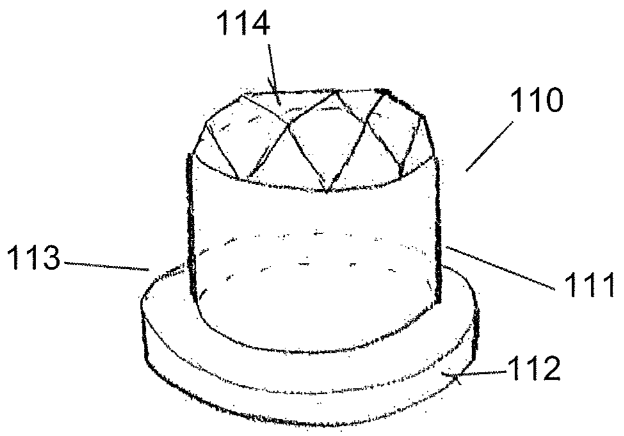
FIG. 7 shows an embodiment of a setting of a design element according to the invention.

FIG. 7 shows an example of a design element 110 in the form of a setting. Said setting comprises a body 113, here in the form of a collet, in which a stone 114, in particular a precious or semi-precious stone, is secured, in particular set. Said body 113 comprises said lateral extension 112 and, together with said stone 114, forms said first portion 111 of the design element.

Figure 8:
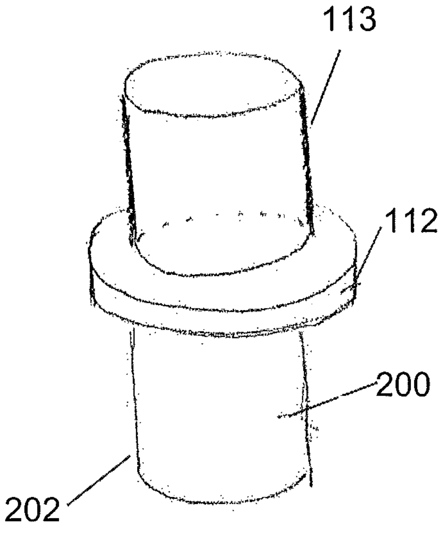
FIG. 8 shows an alternative embodiment of FIG. 7.

In FIG. 8, said body 113 is provided with a peg 200 located on a side 202 of said body 113 opposite that containing the stone 114 (not shown). In other words, said extension 112 is located between said peg 200 and the portion of the body 113 containing the stone 114. Said peg allows the design element to be held in the mounting in a more secure manner, in particular when said peg is rigid.

Assembling these elements firstly involves cutting, for example die-cutting, all or some of the different layers that will form the mounting, so as to have the recesses shaped to match the design element that will be received therein.

For the element 110 for example, the recess 10*b* is cut into the two layers 11 and 12, and then the two layers are glued together to form a body of material. The element 110 is slid into the recess by its face opposite the free face 11*a* of the layer 11. Once the element 110 is in place, the assembly is covered by the layer 13 that is glued on. At the periphery of the first portion 11 of the element 110, the lateral extension 112 is engaged by its two faces with the two bodies of material.

To produce FIG. 2, for example, the layers 22 to 25 can be joined, and a cavity can be made for housing the cone tip of the element 120, preferably in an exact fit. Then, having previously been suitably cut, the upper layer 21 is put in place so as to cover the peripheral region 122.

The invention claimed is:

1. Item comprising a mounting and at least one design element, said at least one design element being a decorative element, embedded in the mounting, the mounting comprising at least one free surface portion, at least a first and a second body of material below the free surface portion, a recess for the design element being made in the first and the second body of the mounting and said design element being arranged within the recess, wherein the design element comprises a first portion, which is visible from the free surface portion of the mounting, and a lateral extension relative to first portion, said lateral extension being covered by the first body of material to secure the at least one design element in the recess, and wherein said design element is a setting comprising a body provided with said lateral extension, and said body containing a stone.

2. Item according to claim 1, wherein the mounting comprises at least one flexible material.

3. Item according to claim 2, wherein said at least one flexible material is a skin, synthetic resin, rubber, textile product, leather, or a combination thereof.

4. Item according to claim 1, wherein the mounting comprises at least one material that is a plant-based, mineral-based, or synthetic material that is rigid or semi-rigid.

5. Item according to claim 4, wherein the at least one material is selected from wood, tiles, metal, glass, a rigid synthetic resin, a cement-based, stone-based or plaster-based material, or a combination thereof.

6. Item according to claim 1, wherein said setting body comprises a peg on a side of the body opposite that containing the stone.

7. Item according to claim 1, wherein at least part of the lateral extension of the design element forms a flange around said first portion.

8. Item according to claim 1, wherein the recess in the mounting comprises a first recess portion for the first portion of the design element and a second recess portion for the lateral extension of the design element, the opening in the first portion of the recess forming a neck for the recess.

9. Item according to claim 1, wherein the mounting comprises at least two interconnected layers of material forming said first and second bodies.

10. Item according to claim 9, wherein the layers are interconnected by bonding or by a mechanical connection.

11. Item according to claim 10, wherein the mechanical connection is a stitching thread.

12. Method for producing an item according to claim 1, comprising the following steps:

a. providing a mounting, having a free surface portion and a first body of material below the surface portion, and a design element having a first, visible portion and a second portion forming a lateral extension;

b. making a recess for the design element in the mounting, wherein the recess is open on the free surface portion, the recess comprising a first portion in the first body of material for the first portion of the design element and a second portion in the second body for the lateral extension;

c. placing the design element in the recess such that the first body of the mounting covers the second portion in the form of a lateral extension to the design element.

13. Method according to claim 12, wherein the mounting comprising at least two layers, a first layer forming the first body and a second layer forming the second body, wherein the two layers are interconnected in order to lock the design element in its recess.

* * * * *